(12) United States Patent
Mangin et al.

(10) Patent No.: US 7,525,970 B2
(45) Date of Patent: Apr. 28, 2009

(54) METHOD AND DEVICE OF DYNAMIC RESOURCE ALLOCATION IN A WIRELESS NETWORK

(75) Inventors: Christophe Mangin, L'Hermitage (FR); Romain Rollet, Rennes (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 484 days.

(21) Appl. No.: 11/016,862

(22) Filed: Dec. 21, 2004

(65) Prior Publication Data
US 2005/0249114 A1 Nov. 10, 2005

(30) Foreign Application Priority Data
Jan. 30, 2004 (EP) .................... 04290255

(51) Int. Cl.
H04L 12/56 (2006.01)
H04L 12/28 (2006.01)

(52) U.S. Cl. .................. 370/395.21; 370/395.41; 370/395.42

(58) Field of Classification Search .......... None
See application file for complete search history.

(56) References Cited

U.S. PATENT DOCUMENTS

| | | | | |
|---|---|---|---|---|
| 6,069,893 A * | 5/2000 | Parruck et al. | ......... | 370/395.42 |
| 6,738,346 B1 * | 5/2004 | Prieto et al. | ......... | 370/229 |
| 7,002,978 B2 * | 2/2006 | Parruck et al. | ......... | 370/412 |
| 2001/0038621 A1 * | 11/2001 | Bauer et al. | ......... | 370/337 |
| 2002/0031127 A1 * | 3/2002 | Parruck et al. | ......... | 370/395.1 |
| 2002/0181470 A1 * | 12/2002 | Agnevik et al. | ......... | 370/395.21 |

OTHER PUBLICATIONS

Romain Rollet, et al., "Field trial results at DLC layer of a HiperLAN/2 prototype", The 57th IEEE Semiannual Vehicular Technology Conference, vol. 2 of 4, XP-002283097, Apr. 22, 2003, 5 pages.

Hossam Fattah, et al., "An Overview of Scheduling Algorithms in Wireless Multimedia Networks", IEEE Wireless Communications, vol. 9, No. 5, XP-001132259, Oct. 2002, pp. 76-83.

Romain Rollet, et al., "Field trial results at DLC layer of a HiperLAN/2 prototype", The 57th IEEE Semiannual Vehicular Technology Conference, vol. 2 of 4, XP-002283097, Apr. 22, 2004, 5 pages.

J. W. Roberts, "Virtual Spacing for Flexible Traffic Control", International Journal of Communication Systems, vol. 7, XP-000672879, 1994, pp. 307-318.

(Continued)

*Primary Examiner*—Firmin Backer
*Assistant Examiner*—Clemence Han
(74) *Attorney, Agent, or Firm*—Oblon, Spivak, McClelland, Maier & Neustadt, P.C.

(57) ABSTRACT

A method of dynamic transmission resource allocation that operates in a wireless network. The wireless network includes a plurality of mobile terminals each managing a given number of different data flows of protocol data units that are classified according to a set of flow types, a radio resource management unit for allocating transmission resources on a per protocol data unit basis, a plurality of schedulers operating according to a specific set of rules, and a selector for sharing the transmission resource among the mobile terminals.

24 Claims, 6 Drawing Sheets

OTHER PUBLICATIONS

Ajay Chandra, et al., "Wireless Medium Access Control Protocols", IEEE Communications Surveys, Second Quarter 2000, pp. 2-15.

Pierre E. Boyer, et al., "Spacing Cells Protects and Enhances Utilization of ATM Network Links", IEEE Network, Sep. 1992, pp. 38-49.

David A. Eckhardt, et al., "Effort-limited Fair (ELF) Scheduling for Wireless Networks", IEEE INFOCOM 2000, pp. 1-10.

S. Jamaloddin Golestani, "A Self-Clocked Fair Queueing Scheme for Broadband Applications", IEEE, 1994, pp. 636-646.

Hari Balakrishnan, et al., "A Comparison of Mechanisms for Improving TCP Performance over Wireless Links", IEEE/ACM Transactions on Networking, Dec. 1997, 17 pages.

T. S. Eugene NG, et al., "Packet Fair Queueing Algorithms for Wireless Networks with Location-Dependent Errors", CMU-CS-00-112, School of Computer Science, Carnegie Mellon University, Feb. 2000, pp. 1-37.

Hui Zhang, et al., "Comparison of Rate-Based Service Disciplines", Proceedings of ACM SIGCOMM, 1991, 10 pages.

Parameswaran Ramanathan, et al., "Adapting Packet Fair Queueing Algorithms to Wireless Networks", To appear in Proceedings of MOBICOM, 1998, pp. 1-9.

Hui Li, et al., "Automatic Repeat Request (ARQ) Mechanism in HIPERLAN/2", Ericsson, 5 pages, 2000.

Songwu Lu, et al., "A Wireless Fair Service Algorithm For Packet Cellular Networks", Coordinated Science Laboratory, University of Illinois, 11 pages, 1998.

* cited by examiner

METHOD AND DEVICE OF DYNAMIC RESOURCE ALLOCATION IN A WIRELESS NETWORK

BACKGROUND OF THE INVENTION

1. Technical Field

The present invention relates generally to communication networks, and more particularly to the dynamic resource allocation in a network based on a centralised transmission resource allocation.

2. Related Art

Wireless Local Area Networks (WLANs) have recently experienced a rapid development mainly due to the increase of the bandwidth they can offer. Concurrently, the number of users and the diversity of applications have grown. As a consequence, a WLAN simultaneously transports a large number of data flows generated by several types of applications. It results there from that the transmission resource which remains relatively scarce, requires a very efficient allocation mechanism. On the other hand, such a type of network as a wireless network provides a transmission resource not very reliable due to the radio medium. It results from it that some transmission errors can occur on one or several data flows.

Herein below, the term "data flow" will refer to a data transmission originating from a given user for a given application between a transmitter and a receiver and the term "flow type" will refer to a data transmission originating from a given type of application, independently of the corresponding users.

All applications transport over such a network can be very different regarding the Quality of Service (QoS) requirements. Actually, whereas a simple best effort service can be sufficient for data applications transported by TCP for example, multimedia applications such as interactive video and sound transmission can require a more stringent service and a better QoS. The transmission corresponding to the applications requiring a good QoS are based on such key parameters as the maximum throughput and the maximum transmission delay. Consequently, for such applications a network is classically in charge of guaranteeing these key parameters.

On the other hand, a radio channel propagation can be very fluctuating. Consequently, the physical or PHY layers developed for recent WLANs are able to dynamically support different coding methods in order to efficiently adapt to radio channel propagation and to fit in different environments. It results there from that the Medium Access Control or MAC layer can use an available PHY resource which is variable along time and which will be referred to as transmission resource herein below. In a centralised allocation scheme handled by a Radio Resource Management or RRM unit, the available transmission resource can be shared by the RRM unit between the different user data flows generated by applications. Moreover, the RRM unit can take into account the requirements of the different applications in order to optimise the shared resource transmission. Classically, such a RRM unit implements a scheduling mechanism, which defines one or more principles to share a transmission resource.

Various scheduling mechanisms have already been proposed to share the transmission resource in a WLAN network. More particularly, the document "An overview of scheduling algorithms in Wireless Multimedia Networks", IEEE Wireless Communications, October 2002, written by H. Fattah and C. Leung, presents a scheduling mechanism based on some compensation schemes. A compensation scheme classically refers to a scheme able to compensate transmission delay experienced by a given data flow, due to transmission errors for example, among a list of data flow. More particularly, in the document cited above, an objective of the compensation schemes is to achieve fairness between data flows generated by applications regarding the errors due to radio channel degradations. Stated otherwise, a scheduling mechanism ensures that transmission resource is preferably allocated to a data flow experiencing transmission errors in order to compensate these errors.

In the document S. Lu, T. Nandagopal and V. Bharghavan, "A wireless fair service algorithm for packet cellular networks," in Proc. of ACM MOBICOM '98, October 1998, in the document P. Ramanathan and P. Agrawal, "Adapting packet fair queuing to wireless networks," in Proc. of ACM MOBICOM '98, October 1998, in the document T. S. Eugene Ng, I. Stoica, H. Zhang, "Packet fair queuing algorithms for wireless networks with location-dependent errors," in Proc. of IEEE INFOCOM '98, March 199, and in the document T. Nanddagopal, S. Lu, V. Bharghavan, "A Unified Architecture for the Design and Evaluation of Wireless Fair Queuing Algorithms," in Wireless Networks, vol. 8, pp. 231-247, 2002, scheduling mechanisms are proposed which rely on a swapping mechanism. In these documents, a scheduling mechanism is proposed to handle data flows experiencing channel errors to data flow with a clear channel. Then, different methods are presented to restore equity between data flows and to give back more transmission resource to penalised data flows once their channel is clear.

In these proposals, the same scheduling mechanism is applied to all data flows. However, as it is already written above, different applications and different users in a given network do not require same QoS constraints. On the other hand, the effects induced on applications by a scheduling mechanism are not the same ones according to the type of applications. Considering one of major issues is to fulfil the application requirements, it could be profitable to define different classes of applications and different fairness principles in order to apply to each of these classes a corresponding fairness principle. Such a scheduling mechanism has been already described in D. A. Eckhardt and P. Steenkiste, "Effort-limited fair scheduling (ELF) for wireless networks," in Proc. of IEEE INFOCOM 2000, March 2000.

Regarding the previous description, a lot of propositions for wireless scheduling mechanisms have been already discussed and proposed. However, these types of mechanisms can always be improved depending on different constraints and objectives to be solved.

SUMMARY OF THE INVENTION

In view of the foregoing, mainly in a system based on a TDMA scheme; there is a need for a scheduling mechanism adaptable to many types of applications having different QoS constraints and requiring simultaneous transmission in a given network based on a centralised transmission resource allocation.

In a first aspect, the invention proposes thus a method of dynamic transmission resource allocation in a wireless network comprising:

a plurality of Mobile Terminals or MTs each managing a given number of different data flows of Protocol Data Units or PDUs which are classified according to a set of predetermined flow types;

a Radio Resource Management or RRM unit for allocating transmission resources on a per PDU basis;

a plurality of schedulers each being associated to a respective flow type and each carrying out a respective scheduling scheme according to a specific set of rules; and a selector for sharing the transmission resource among the MTs, the method comprising:

the MTs or the RRM unit requesting transmission resource for transmission of pending PDUs by sending Request Resource or RR messages to the RRM unit each RR message including a flow type information;

the RRM unit dispatching the RR messages to the associated schedulers based on the flow type information;

each one of the associated schedulers electing one PDU of one data flow of the respective flow type as candidate for a next transmission resource allocation among the data flows of the respective flow type, independently from the other schedulers and based on the specific set of rules;

the selector allocating transmission resource to one candidate chosen among the candidates as a function of a set of priority rules where a respective priority is assigned to each flow type;

wherein the set of predetermined flow types comprises a first set of flow types assigned with comparatively higher priorities and a second set of flow types assigned with comparatively lower priorities;

wherein the set of rules specific to a scheduler associated to a flow type belonging to the second set of flow types comprises a first subset of rules applied in case of error free transmission, and a second subset of rules, different from the first subset of rules applied in case of transmission errors;

and wherein the second subset comprises a rule for reducing the bandwidth allocated to data flows belonging to the second set of flow types compared to the bandwidth allocated thereto according to the first subset of rules.

A second aspect of the invention relates to a device for allocating transmission resource comprising means for carrying out the method according to the first aspect.

Advantageously, different policies may be applied at scheduler level based on transmission errors detection.

BRIEF DESCRIPTION OF THE DRAWINGS

Further features and advantages of the present invention will become more apparent from the description below. The latter is given purely by way of illustration and should be read in conjunction with the appended drawings, of which:

FIG. 2-B illustrates a Frame Structure according to the HiperLAN/2 protocol.

DESCRIPTION OF PREFERRED EMBODIMENTS

Figure 1:
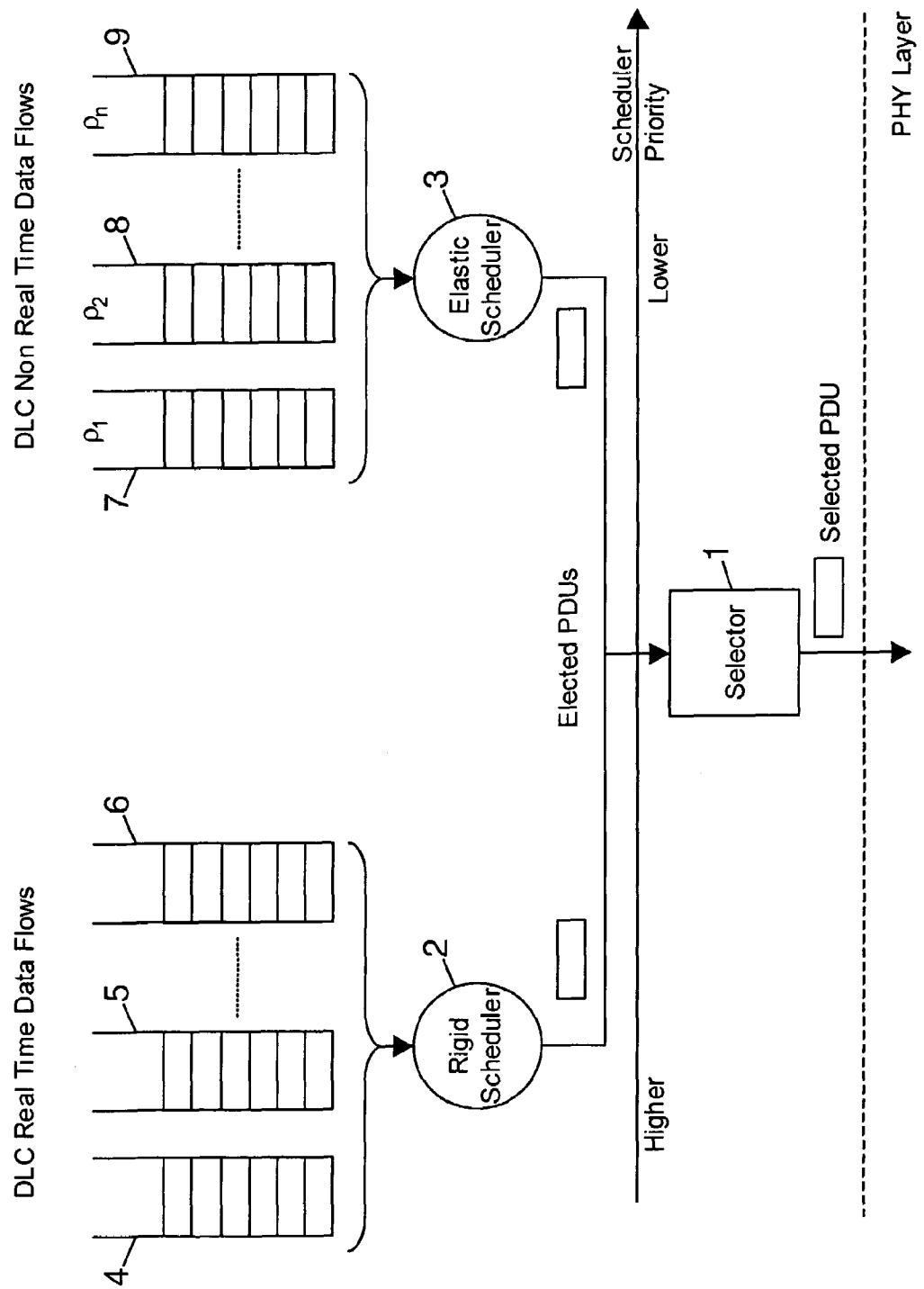
FIG. 1 illustrates an architecture of a method according one embodiment of the invention.

The present invention proposes a dynamic transmission resource allocation based on a plurality of scheduling schemes carrying out their respective rules independently each other.

One exemplary embodiment of the present invention takes place in a wireless network comprising Mobile Terminals or MTs including a communication protocols stack based on the HiperLAN/2 or HLAN/2 or H/2 standard defined by the European Telecommunication Standard Institute or ETSI. The transmission resource in the wireless network is shared among all MTs of this network, by the RRM unit. This RRM unit is in charge of centralising the allocation of the transmission resource in the network. Preferably, the transmission resource allocation is based on a TDMA scheme. Of course the scope of the invention encompasses applications to any stack of communication protocol layers, as well as applications to other types of networks and to a transmission resource allocation which is not based on TDMA scheme. However, for the sake of better understanding, the following description is applied to a network based on the HLAN/2 standard. The description below presents an overview of the HLAN/2 standard.

The HLAN/2 protocol stack defines a set of layers from the PHY layer based on a 5 GHz Orthogonal Frequency Division Multiplexing or OFDM technology up to the convergence layers that allow the interconnectivity with a large diversity of networks (Ethernet, Internet Protocol or IP, Universal Mobil Telecommunication System or UMTS). The Data Link Control or DLC layer is data flow-oriented and a transmission resource allocation for the different MTs is centralised in the RRM unit. The HLAN/2 standard neither defines any particular scheduling mechanism nor any QoS parameter. However, it provides a set of signalling messages that are sufficient to implement an advanced scheduling scheme. Advantageously, one embodiment of the present invention proposes to use this set of signalling messages to describe a clear exemplary embodiment of the invention.

Herein, the term data flow refers to a flow of data corresponding to a given application emitted by a transmitting end-point and received by a receiving end-point, and transmitted across the considered network.

This section introduces an application of an embodiment of the present invention. Globally, one embodiment of the present invention is based on a classification of different flow types according to some requirements regarding the QoS constraints corresponding to the different data flows. Such a classification provides a set of flow types. For the sake of better understanding, in one embodiment of the invention, the set of flow types comprises the following flow types:

real-time flow type corresponding to real-time applications which are associated with strong bandwidth and delay constraints;

non-real-time flow type corresponding to best effort applications that tolerate relatively more transmission delay and can adapt to the available bandwidth offered by the network.

Typical examples of the applications comprised in the real-time flow type are video and audio streams. In the following of the description, this type of applications will be referred to as rigid applications.

The applications comprised in the non-real-time flow type classically correspond to an Internet environment and are mainly supported by TCP transactions. This type of applications will be referred to as elastic application.

In one embodiment of the present invention, one specific scheduling mechanism is defined and applied on a per flow type basis. Such a scheduling mechanism is preferably introduced at the DLC level. Consequently, the following will refer to a scheduling mechanism for real-time flow type as rigid scheduling and to a scheduling mechanism for non-real-time flow type as elastic scheduling. Of course, the present invention encompasses application to any set of flow types.

In case of transmission errors, some Protocol Data Units are lost. Some applications retransmit all lost Protocol Data Units or PDUs. Consequently, in case of transmission error, a part of transmission resource is used for retransmission of lost PDUs. Depending on the flow types, transmission errors do not induce same consequences. Though the real time data flows have strong bandwidth and delay constraints, they are able to absorb a limited delay caused by retransmission of the lost PDUs. Conversely, due to their greater immunity to delay and bandwidth reduction, the non real-time flow type can cope with larger decrease of allocated transmission resource than the real time applications.

One embodiment of the present invention is preferably based on a network where data flows are based on data flow-oriented principle and where the transmitted MAC PDUs are of fixed short-size.

Furthermore, in a HLAN/2 network, transmission resource available varies along time due to a variable signalling overhead and the adaptive transmission capability provided by the PHY layer.

Figure 2A:
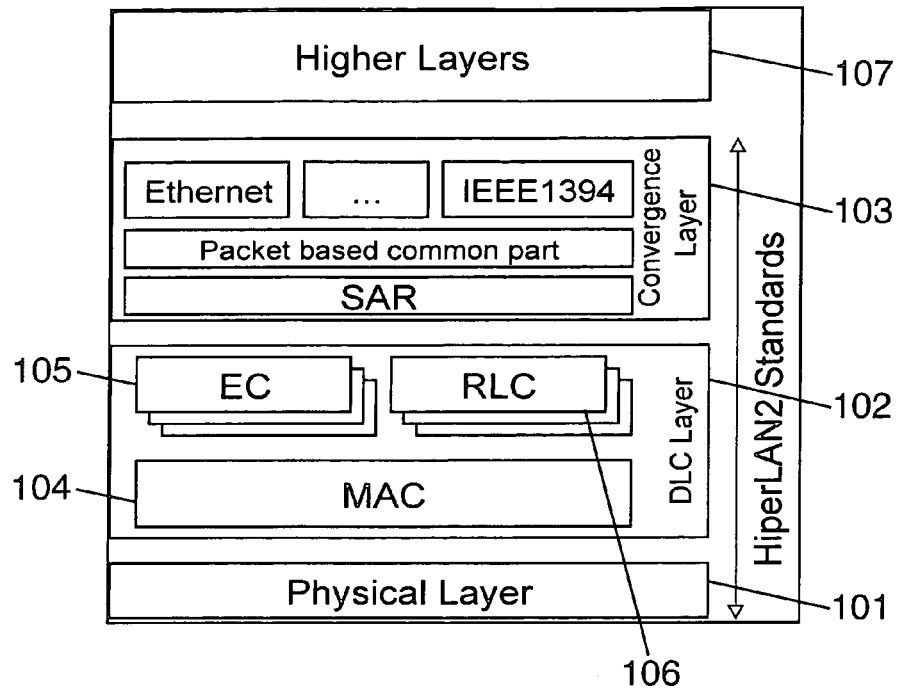
FIG. 2-A illustrates a protocol stack according to the HiperLAN/2 protocol.
Figure 2B:
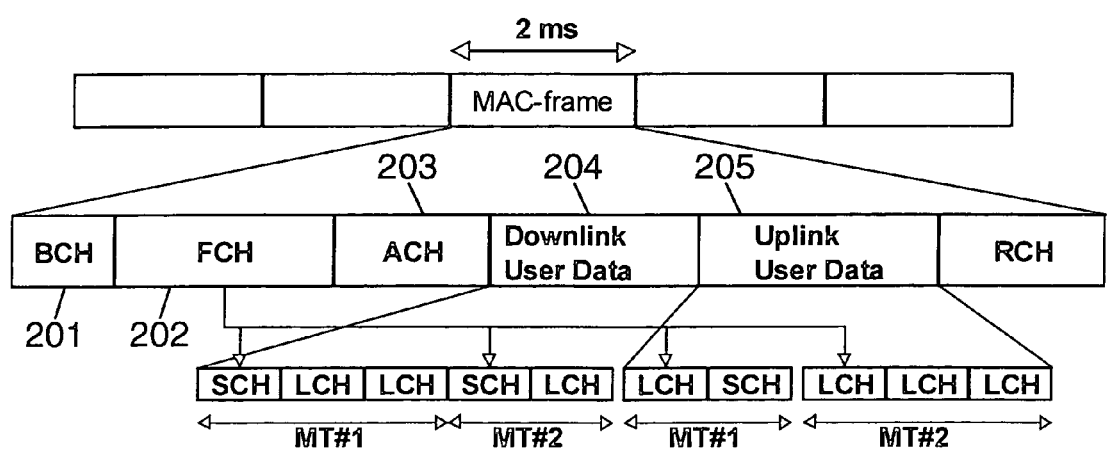

FIG. 2-A illustrates a stack of protocol according to the HLAN/2 standard. The stack comprises three layers: a Convergence Layer 103, a Data Link Control layer or DLC 102 and a PHY Layer 101. In its user plane, the DLC 102 is made up of two functions: the Medium Access Control or MAC 104 and Error Control or EC 105. On the other hand, its control plane consists of the Radio Link Control or RLC 106.

The Convergence Layer 103 is in charge of mapping the service requirements of the Higher Layers 107 onto the service offered by the DLC 102, and adapting the various Higher Layer packet formats to the MAC service data unit format. The PHY Layer data units are variable-length bursts that consist of a preamble followed by a payload field. The payload field comprises various MAC data entities. The PHY layer provides several combinations of coding rates and modulation schemes that allow the implementation of link adaptation mechanisms.

Within the DLC 102, the RLC 106 provides a set of signalling protocols that support the following signalling entities: Association Control Function, Radio Resource Control function and the DLC user Connection Control. The RLC messages are exchanged between the MTs and the RRM unit through dedicated data flows provided by the DLC 102.

At this step, basic architecture of a protocol stack according to the HLAN/2 has been exposed. The following sections will give a more detailed description of the DLC features that have an impact on scheduling schemes according to one embodiment of the present invention which takes place in a network based on stack of protocol HLAN/2. Of course, this type of network has been chosen for the sake of better understanding.

Medium Access Control

The HLAN/2 MAC is a TDMA protocol where time is divided into fixed-length time frames of 2 ms. Within the frame, multiplexing of downlink and uplink flow is based on Time-Division Duplex or TDD. In addition, data transmission in such a network is based on a data flow oriented scheme. FIG. 2-B shows a MAC basic frame structure which comprises successive parts, each part containing the following so called transport channels: Broadcast CHannel or BCH 201, Frame control CHannel or FCH 202, Access feedback Channel or ACH 203, DownLink data or DL 204 and UpLink data or UL 205, and Random-access CHannel or RCH 206. An additional part, called Direct Link or DiL, can be provided for direct data transmission between the MTs without going through the RRM unit. The length of the BCH 201 is fixed, whereas the other transport channels have a variable duration, which depends on the data flow to be carried on the wireless channel.

The BCH 201 is a beacon sent at the beginning of every MAC frame to all MTs that mainly contain control information common for a given group of MTs comprised in the same cell.

The FCH 202, which is broadcast in every MAC frame, contains the description, on a per data flow basis, of the resource allocation within the DL 204, UL 205 (and eventually DiL) parts of the current MAC frame.

DL, DiL and UL parts are arranged in so called PDU trains that contain data exchanged between a given MT and the RRM unit (in DL and UL parts) or between a couple of MTs via a DiL. Two types of PDU are defined: 54-byte Long transport CHannel PDUs or LCH-PDUs and 9-byte Short transport CHannel PDUs or SCH-PDUs. LCH-PbUs convey signalling or user data flow data whereas the SCH-PDUs are used to transport signalling messages.

The RCH 206 is a contention channel, based on a slotted ALOHA scheme, that can be used by the MTs to send signalling messages to the RRM unit whenever they have not been allocated resource in a UL PDU train. Messages sent via the RCH are acknowledged via the ACH channel 203.

The HLAN/2 MAC protocol handles the UL part as a Centralised Demand Assignment Protocol, as it is described in the document "Wireless medium access control protocols" in IEEE communications Surveys and Tutorials, A. Chandra, V. Gummala and J. O. Limb, second quarter 2000. A Centralised Demand Assign Protocol operates according to three steps: request, scheduling and data transmission. For a data transmission from a MT to the RRM unit, which is referred to as a UL transmission, the MT requests to the RRM unit transmission resource, preferably by means of Resource Request or RR messages. When an MT requests a transmission resource, generally some LCH-PDUs are pending to be transmitted in some queues of the MT. More precisely, an MT generally manages one queue per data flow. The RRM unit applies a quite same management. The RR message indicates the number of LCH-PDUs pending in the MT queues for a particular data flow. Based on these requests, the RRM unit allocates resources for the UL transmissions of the MTs according to the output of a scheduling mechanism and advertises the corresponding UL part structure in the next frame FCH 202. The MTs then transmit their pending PDUs in contention free mode by inserting LCH-PDUs and SCH-PDUs in accordance with the frame structure information given in the FCH 202.

In a similar way, the same scheduling scheme is used to share the transmission resource between the data flows transported in the DL part 204, depending on the state of the data flow queues in the RRM unit.

Error Control

In the DLC 102, the EC 105 can comprise several operational modes. The HLAN/2 standard defines three EC modes that apply to the DLC data flows mainly depending on the flow type they support.

A first EC mode is referred to unacknowledged mode. This mode is a "no error control" mode that provides unreliable transport with no retransmission.

A second EC mode is referred to as repetition mode. In this mode, the LCH-PDUs are systematically repeated a given number of times so that a relatively higher level of reliability can be achieved.

A third EC mode is referred to as acknowledged mode. This mode implements a retransmission mechanism in order to guarantee a reliable transport. Generally, the retransmission scheme is a selective-repeat Automatic Repeat reQuest or ARQ that makes use of efficient feedback messages sent by the data flow receiving end point to the transmitting end point. The document H. Li, J. Lindskog, G. Malmgren, G. Myklós, F. Nilsson, G. Rydnell, "Automatic repeat request (ARQ) mechanism in HiperLAN/2," in Proc. of IEEE VTC 2000 Spring, May 2000 describes this type of retransmission scheme. These feedback messages are used by the transmission side to update a corresponding transmission sliding window. Depth of the transmission window ranges from 32 up to 512 LCH-PDUs. A delay induced by a non-progressing window can be controlled through a discard mechanism, classically known.

At this step, the most useful and important details regarding the HLAN/2 network has been provided above. This section introduces some basic principles according to one embodiment of the present invention, first in case of error-free data flows. Two types of DLC data flows are defined to reflect the application classification introduced above with rigid and elastic applications respectively carrying real-time and non-real-time data flows. Of course, as it has already been noted, the present invention encompasses a classification of data flows according to more flow types. In one preferred embodiment of the invention, a single DLC data flow can correspond to several application data flows which are advantageously aggregated in one DLC data flow.

In one embodiment of the invention, one scheduling mechanism is preferably defined per flow type. The set of flow types comprises a rigid flow type and an elastic flow type. Then, one elastic scheduling mechanism and one rigid scheduling mechanism are preferably defined. Each scheduling mechanism is based on a set of rules specific to the flow type for which it is defined. In one preferred embodiment, a transmission resource allocation is managed independently for rigid data flows and for elastic data flows in a hierarchical manner. Stated otherwise, a priority is given to one of the flow types and the transmission resource is allocated first for the data flows comprised in the priority flow type. According to previous sections, it is relevant to define the rigid data flows with the highest priority, whereas the elastic data flows have the lowest priority. It results from it that the transmission resource is first allocated to the rigid data flows, whereas the remaining transmission resource is allocated to the elastic data flows. Consequently, the transmission resource is at first shared among the rigid data flows and the remaining transmission resource is shared between the elastic data flows. Stated otherwise, the overall transmission resource is dynamically divided into two resource pools: the rigid and elastic resource pools. It is assumed that the consistency of the global transmission resource allocation, among the flow types and among the data flows in a given flow type, is guaranteed by a Call Acceptance Control or CAC function, which is not described herein. Each scheduling mechanism is performed by a so-called scheduler. In practice, two types of rate-based schedulers are used to share the resource within each flow type, as it is described in the document H. Zhang and S. Keshav, "Comparison of rate-based service disciplines," in Proc. of ACM SIGCOMM '91, pp. 113-121, September 1991. In one embodiment of the present invention, the rigid scheduler is preferably based on a Jitter Earliest Due Date or EDD service discipline with packet spacing derived from a Virtual Scheduling Algorithm as described in the document. P. Boyer, F. Guillemin, M. Servel, J.-P. Coudreuse, <<Spacing cells protects and enhances utilisation of ATM network links,>> in IEEE Network Magazine, vol. 6, no. 5, pp. 38-49, September 1992. Such a rate-controlled EDD discipline provides guaranteed delay and bandwidth. The elastic scheduler preferably implements a Self-Clocked Fair Queuing or SCFQ scheme, as proposed in the document J. Roberts, "Virtual spacing for flexible traffic control," in Int'l Journal of Communication Systems, vol. 7, pp. 307-318, 1994 and in the document S. J. Golestani, "A self-clocked fair queueing scheme for broadband applications," in Proc. of IEEE INFOCOM '94, vol. 2, pp. 636-646, June 1994. Such a SCFQ scheme serves the data flows in proportion of a pre-determined share of the available elastic transmission resource. One instance of each scheduler type is implemented, so that the UL and DL parts of the rigid, respectively elastic, resource transmission are both treated by the rigid, respectively elastic, scheduler. Stated otherwise, each scheduler performs a selection among the data flows comprised in the corresponding flow type to perform a election of a candidate for transmission resource allocation in order to provide a given PDU which is a candidate to be transmitted according to its respective specific set of rules. Consequently, each scheduler selects one candidate to be transmitted, and then as many PDUs as schedulers are candidates for next transmission resource allocation.

Advantageously, a selector is introduced in order to perform the selection between all PDUs which have been selected by their respective schedulers as candidates for next transmission resource allocation. In one preferred embodiment, such a selector is based on a set of priority rules. According to these rules, the selector performs transmission resource allocation. In one embodiment of the invention, the selector is in charge of selecting one PDU among one PDU issued from the rigid scheduler output and one PDU issue from the elastic scheduler output. Furthermore, such a selector checks whether a PDU selected for transmission by one of the schedulers can be physically inserted onto the physical medium in order to adapt to the variable bandwidth provided by the PHY layer for user data transmission.

FIG. 1 shows an architecture representing a method according to one embodiment of the invention. Different data flows 4, 5, 6, 7, 8 and 9 are grouped according to their flow type. A scheduler 2 is associated to the data flows 4, 5 and 6 corresponding to the same flow type. On the other hand, a scheduler 3 is associated to the data flows 7, 8 and 9 corresponding to the same flow type. Each one of schedulers 2 and 3 elect one PDU as candidate for a next transmission resource allocation. A selector 1 selects one PDU among both elected PDUs according to the set of priority rules.

Set of Rules for Scheduling Mechanism

This section will describe an exemplary set of rules according to one embodiment of the invention. Classically, a scheduling mechanism allocates transmission resource to a data flow i based on a parameter which is referred to as a weight $W_i$. For a rigid data flow, the parameter $W_i$ reflects the peak bit rate of the data flow whereas for an elastic data flow, the parameter $W_i$ reflects the minimum bit rate in an error-free service. This parameter $W_i$ is generally defined by the Convergence Layer 103 at the time of the establishment of the data flow.

In one embodiment of the invention, as it has been already explained, the basic data entities considered for resource allocation are LCH-PDUs of fixed length, referred to as PDUs in the following. Consequently, the bit rate is advantageously translated into a fixed inter-PDU time interval $T_i$ with $$T_i = \frac{1}{W_i}.$$

Time representation is normalised so that the duration of a PDU equals to 1 unit of time. It results from it that the schedulers can assign a transmission date to the successive PDUs of the data flow i by maintaining a state variable named Theoretical Transmission Time or $TTT_i$ that represents the date of the next PDU of the data flow i shall be sent over the corresponding link. $TTT_i$ is updated upon the transmission of a PDU and eventually upon the arrival of a new PDU in the data flow queue whenever the latter is not backlogged, as it will be described below. A number $Q_i$ indicates the number of PDUs stored in the queue. This number is preferably reported to the RRM unit through the RR messages for the UL data flows; whereas $Q_i$ of DL data flows are locally updated each time a PDU is produced by the Convergence Layer103.

In a preferred embodiment of the present invention, a given scheduler finally serves the data flow which is assigned the minimum $TTT_i$.

Set of Rules for Rigid Scheduler

Classically, the rate-controlled non-work-conserving service policy implemented by the rigid scheduler guarantees that the rigid data flows will never receive more transmission resource that the peak bit-rate corresponding to the inter-PDU emission interval $T_i$. This property is achieved by serving the selected data flow, i.e. the data flow with the minimum $TTT_i$, only once this $TTT_i$ is actually due. For that purpose an additional spacing variable is introduced, referred to as CurrTime, which is a linear function of time that represents a time reference to be compared with the $TTT_i$. The data flow with the minimum $TTT_i$ is then selected for the transmission if the latter is smaller than CurrTime, thus ensuring that two PDUs of the data flow i are spaced out by $T_i$.

Upon reception of a PDU or a RR message for a PDU belonging to the data flow i, the following steps are performed:

```
If Q_i = 0
    If {TTT_j, Q_j ≠ 0} ≠ ∅ /* there is at least one backlogged data flow */
        TTT_i = max(TTT_i, min(CurrTime, min_j(TTT_j)))
    Else
        TTT_i = max(TTT_i, CurrTime)
    Endif
Endif
Q_i = Q_i + 1
```

Upon a transmission of a PDU of a given data flow, the corresponding scheduler executes the following steps:

```
If TTT_i = min_j(TTT_j), with j such as Q_j ≠ 0.
/* TTT_i is the minimum Theoretical Transmission Time among all
backlogged
data flows */
    If TTT_i ≤ CurrTime
        Send PDU at the head of Q_i
        TTT_i = TTT_i + T_i
        Q_i = Q_i - 1
    Endif
Endif
```

Set of Rules for Elastic Scheduler

Classically, the elastic scheduler is based on a work-conserving service discipline, i.e. the elastic scheduler is never idle as long as a PDU is present in one of the data flow queues. Such a scheduling mechanism is described in the document S. J. Golestani, "A self-clocked fair queuing scheme for broadband applications," in Proc. of IEEE INFOCOM '94, vol. 2, pp. 636-646, June 1994. A fairness achieved by such a rule guarantees that each data flow receives a share of the elastic bandwidth regarding transmission resource that is proportional to its respective weight $W_i$. In addition, due to the work-conserving aspect, the share may be greater than the minimum bit rate reflected by $W_i$ when the offered capacity is greater than the sum of the minimum bit-rates of the elastic data flow. The delay experienced by a data flow is also bounded as long as it is allocated its minimum bit-rate.

Upon reception of a PDU or a RR message for a PDU belonging to the data flow i, the following operations are performed:

```
1.  If Q_i = 0
2.      If {TTT_j, Q_j ≠ 0} ≠ ∅ /* there is at least one
            backlogged data flow */
3.          TTT_i = max(TTT_i, min_j(TTT_j))
4.      Else
5.          TTT_i = max(TTT_i, TTT^-1), with TTT^-1 being the
            Theoretical Transmission
            Time of the last sent PDU
6.      Endif
7.  Endif
8.  Q_i = Q_i + 1
```

Upon transmission in a given data flow, the corresponding scheduler executes the following steps:

```
1.  If TTT_i = min_j(TTT_j), with j such as Q_j ≠ 0.
    /* TTT_i is the minimum Theoretical Transmission Time among all
    backlogged data flows */
2.      send PDU at the head of Q_i
3.      TTT_i = TTT_i + T_i
4.      Q_i = Q_i - 1
5.  Endif
```

Schedulers Outputs and Selector

The content and the structure of the HLAN/2 frame are defined dynamically according to the number of scheduled data flows, to the amount of PHY layer resource they consume due to adaptive transmission and to the number of MTs involved. In addition, some frame building rules are applied and some resources are provisioned for the signalling channels associated with the various DLC control plane functions.

It results from it that various overhead are introduced. Consequently, PHY layer overhead (burst preambles, guard intervals, etc . . . ) and signalling overhead (FCH referenced 202, SCH) change from one frame to the next one, and then the capacity offered by the PHY layer appears as a variable resource for the DLC. However, the schedulers aim at sharing a non variable transmission resource that can be expressed in terms of bits offered by the DLC layer.

Advantageously, in one embodiment of the present invention the selector is in charge of performing a mapping function. The mapping function checks whether the resource required to emit a PDU elected by one of the schedulers is available at the PHY level. On the other hand and as it has already been described, such a selector is also in charge of selecting one output among the outputs of the schedulers. Preferably, in the case of rigid and elastic data flows, the selector manages the resource allocation priority scheme where rigid data flows have a higher priority than the elastic data flows in the access to the wireless transmission resource.

The mapping function performed by the selector is implemented taking into account the MAC protocol and PHY layer features. Therefore this mapping function is not described here.

In the previous description, some basic principles of one embodiment of the present invention have been described in a particular condition when no transmission errors occur for the sake of understanding. In the following, one embodiment of the invention will be described in case of transmission errors when transmission resource is consumed for retransmission of the lost PDUs.

Transmission Errors Detection

Even though the RRM unit and the MTs share the same wireless channel, transmission errors are generally time and location dependent. These errors occur due to interference, fades, etc . . . which can vary with the physical location of the different MTs. A data flow is said to perceive a clear channel when no error is perceived by both end-points corresponding to the data flow. The channel is said dirty otherwise.

In a HLAN/2, an error detection and correction are generally implemented through an ARQ protocol provided by the HLAN/2 DLC. The ARQ allows the RRM unit to gather transmission errors of each data flow. In case of a DL data flow, PDU transmission errors are reported through ARQ feedback messages. Whereas in case of UL data flow, PDU transmission errors are detected by the ARQ entity attached to the data flow end-point situated in the RRM unit.

Herein it is assumed that when a channel is perceived as dirty by a given data flow, it is still possible to transmit ARQ feedback messages without any error so that data PDU errors can be detected.

Wireless Service Principles

The propositions made in the document S. Lu, T. Nandagopal and V. Bharghavan, "A wireless fair service algorithm for packet cellular networks," in Proc. of ACM MOBICOM '98, October 1998, in the document P. Ramanathan and P. Agrawal, "Adapting packet fair queuing to wireless networks," in Proc. of ACM MOBICOM '98, October 1998, and in the document T. S. Eugene Ng, I. Stoica, H. Zhang, "Packet fair queuing algorithms for wireless networks with location-dependent errors," in Proc. of IEEE INFOCOM '98, March 1998, already previously cited, are based on this swapping mechanism that aims at giving scheduling opportunities of data flows experiencing channel errors to those with a clear channel. One embodiment of the present invention proposes a dynamic transmission resource allocation based on wireless scheduling principles which are not based on a swapping mechanism. In addition, it does not rely on a channel state knowledge unlike the algorithms presented in the document "A wireless fair service algorithm for packet cellular networks," and in the document "Adapting packet fair queuing to wireless networks," cited above. Indeed, the channel probing, as it was implemented in the document "A wireless fair service algorithm for packet cellular networks," for instance in the context of the Institute of Electrical and Electronics Engineer or IEEE 802.11 standard through an RTS-CTS procedure, cannot be performed prior to sending a PDU. The transmission success or failure of a PDU is detected and reported a posteriori through ARQ procedures, as explained above, triggering a potential retransmission.

Advantageously, one embodiment of the present invention proposes a resource redistribution policy which will be performed in case of transmission errors detection. Such a resource redistribution policy allocates more transmission resource to data flows facing PDU retransmissions compared to transmission resource allocated in case of no transmission errors. This transmission resource allocated in addition in case of transmission errors will be referred to as extra transmission resource. Since the overall capacity offered by the cell is finite, the retransmission resource policy retrieves extra transmission resource preferably and advantageously from a given set of data flows that can maintain an acceptable service even if the transmission is perturbed. As it has been discussed above, in a wireless Internet environment, the data flow generated by elastic applications mainly consists of TCP flows. TCP can absorb relatively large bandwidth and transmission delay variations as long as the resulting delay measured by its congestion control remains within a given bound as it is explained in the document H. Balakrishnan, V. N. Padmanabhan, S. Seshan, R. H. Katz, "A comparison of mechanisms for improving TCP performance over wireless links," in IEEE/ACM Transactions on Networking, vol. 5, no. 6, pp. 756-769, December 1997.

In contrast, the rigid data flows can cope with transmission delay or bandwidth variations to a much lesser extent. Consequently, and taking advantage of the separation between the elastic and rigid data flow capacities introduced in the scheduling schemes according to one embodiment of the invention, an extra transmission resource is created for PDUs retransmission by a pre-emption process which is performed on transmission resource which are allocated to elastic data flows. The resource pre emption causes a reduction of the elastic data flow capacity. The corresponding elastic data flows are in a particular state referred to as pre-empted state. Such an extra transmission resource is then used to compensate other data flows experiencing transmission errors. In this particular respect, it resembles the scheme.devised by Eckhardt, which is a document already cited above. It can be similar in the sense that it consists in forcing the elastic data flows, even if the channel corresponding to an elastic data flow is clear, to relinquish a fraction of their bandwidth so that data flows affected by errors can be allocated more resource to perform their retransmissions. However, where Eckhardt achieves this reduction by increasing the bandwidth allocated to the rigid data flows (of higher priority) perceiving a dirty channel, we explicitly force the elastic data flows to transmit at a lower bit rate. In addition, an embodiment of the invention specifically addresses the effects of the resulting service degradation inflicted to the elastic data flows and considers it should be "graceful" enough not to disturb TCP end to end congestion control.

The pre-empted resource regained from the elastic data flows can then be redistributed among rigid and elastic data flows experiencing errors, according to some fairness rules that take into account some parameters in relation to quality of service constraints related to the type of transported applications. Such parameters are preferably a maximum acceptable delay for the rigid data flows and a pre-emption factor for the elastic data flows as it will be explained below. Of course, other parameters can be taken into account here.

Wireless Scheduling Algorithm

The wireless scheduling scheme is an evolution of the basic error-free scheduling scheme presented previously herein. No modification is introduced in the computation of the $TTT_i$ of both elastic and rigid data flows so that a reference to the ideal error-free service can be maintained. The higher priority data flow with the minimum $TTT_i$ is still selected for transmission when a slot or an available transmission resource is indicated by the Selector. However, some mechanisms are added in order to reduce the actual bandwidth allocated to the elastic data flows as soon as errors are reported by an ARQ procedure and to redistribute this extra transmission resource to the data flows experiencing error. Stated otherwise and more generally, the set of rules corresponding to a scheduler associated to a flow type having a lower priority comprises a specific rule to be applied in case of transmission errors detected on at least one flow of any type. Herein, in one embodiment of the invention with an elastic flow type and a rigid flow type, the elastic scheduler applies this specific rule as soon as transmission errors are detected on at least any one of the data flows. The next section will describe in detail this rule, which has the objective of reducing the transmission resource elastic data flow capacity.

Reducing Elastic Data Flow Capacity

Whenever errors are detected on any data flow, every elastic data flow enters a pre-empted state. The corresponding weight $W_i$ refers to the nominal weight of elastic data flow i when it is not in pre empted state, the pre empted state weight attributed to i then becomes $(1-\rho_i)W_i$, where $\rho_i(0 \leq \rho_i \leq 1)$ being a pre-emption factor, is set administratively upon data flow establishment, and reflects the capacity of the data flow i to accept a transmission resource reduction and then a service reduction. This pre-emption factor should be chosen so that the instant delay variation introduced by the data flow capacity reduction does not affect TCP end to end congestion control, for example. The elastic data flow i is said to enter pre-empted state if the following conditions are met:

i is not already in pre-empted state;
  there is at least one data flow of any type experiencing errors;
  the elastic data flow i is allocated a transmission resource as indicated by the elastic scheduler and the Selector.

Conversely, the elastic data flow i exits from the pre-empted state as soon as all data flows recover from error, i.e. when all PDUs waiting for retransmission have been allocated transmission resource. Data flow capacity reduction is enforced thanks to the introduction of an additional state variable associated with the data flow I, referenced with $R_i$, which is initialised to $(1-\rho_i)TTT_i$ when the data flow i enters a pre-empted state. Then, whenever the data flow i is selected for transmission, a PDU is actually granted if $R_i \leq (1-\rho_i)TTT_i$. If the latter condition is verified, $R_i$ is updated according to:

$$R_i = R_i + T_i, \text{ where } T_i = \frac{1}{W_i}.$$

In contrast, if $R_i > (1-\rho_i)TTT_i$, the transmission resource is not granted to the data flow i and $R_i$ remains unchanged, thus freeing compensation resource for retransmission. In parallel, $TTT_i$ is systematically updated according to: $TTT_i = TTT_i + T_i$, as long as the data flow i has PDUs waiting for initial transmission in its queue.

Redistribution of Extra Transmission Resource

Transmission resource regained from elastic data flows in pre-empted state is allocated to data flows that have PDUs waiting for retransmission. They are first allocated to rigid data flows and to elastic data flows in second place if none of the rigid data flows has PDUs to retransmit.

Selection has to be further performed among error-prone data flows competing for the compensation resource. For that purpose, two different schemes are defined according to whether the selection is made between rigid data flows or between elastic data flows. For rigid data flows, an effort is made to minimise the transmission delay experienced by the data flow, by favouring the rigid data flows with the most stringent delay constraints. For elastic data flows, the chosen policy consists in allocating extra resources proportionally to their nominal weight $W_i$.

Selection Among Rigid Data Flows

When a PDU of the rigid data flow i is initially scheduled, its $TTT_i$ is stored along with the PDU in the ARQ transmission (for a DL data flow) or reception (for a UL data flow) window. The reference E is to designate the subset of error-prone rigid data flows, and $TTT_j^{error}$ the Theoretical Transmission Time of the oldest lost PDU of data flow j, with $j \in E$. An age of that PDU is defined too as $age_j(PDU)=CurrTime-TTT_j^{error}$. For each data flow, this age is bounded by a maximum value $A_{max,j}$ that is preferably administratively defined at data flow set-up.

Then, the transmission resource freed by the elastic data flows is allocated to the data flow i such that:

$$\frac{age_i(PDU)}{A_{\text{Max},i}} = \max_{j \in E}\left(\frac{age_j(PDU)}{A_{\text{Max},j}}\right).$$

If the data flow i has further PDUs to retransmit, $TTT_i^{error}$ is updated with the $TTT_i$ of the next oldest lost PDU of data flow i.

Prior to actually granting the slot to the selected PDU, a preliminary age check can be performed to prevent a PDU from being unnecessarily retransmitted.

If $age(PDU)$ exceeds $A_{max,j}$, further PDUs waiting for retransmission are skipped up to the first PDU whose $TTT_i$ is the closest to CurrTime. The unused transmission resource is then attributed to the latter PDU. This discard mechanism has mainly two effects:
  effort made to compensate a rigid data flow is bounded and will not deprive other data flows of an extra transmission resource;
  data flow catches up accumulated delay (at the expense of loss) and may eventually allow the transported application to recover.

Selection Among Elastic Data Flows

Advantageously, a distribution of an extra transmission resource among the elastic data flows which are in pre-empted state is made in proportion to their initial weight Wi, as proposed in the document <<Packet fair queueing algorithms for wireless networks with location-dependent errors," already cited. This scheduling scheme can be advantageously implemented by maintaining an additional state variable Ci that reflects the amount of the extra transmission resource received by the data flow i while it is facing transmission errors. E refers to the subset of error-prone elastic data flows then, upon detection of the first lost PDU of data flow i, Ci is initialised as follows:

$$C_i = \max(C_i, \min_{j \in E}(C_j))$$

When a transmission resource becomes available for retransmission by an elastic data flow, the data flow j with the minimum $C_j$ is allocated. If the data flow j has further PDUs to retransmit, $C_j$ is then updated according to:

$$C_j = C_j + T_j.$$

Consequently, the way the wireless scheduling algorithm manages a data flow depends on the state of the data flow. This state is defined by the class of some QoS constraints—for example rigid or elastic—by the data flow belongs to and by its error status. Rigid data flows that do not experience error are not disturbed and they are strictly fed according their nominal rate. Data flows that suffer from errors are compensated up to a certain extent that derives from the administratively set pre-emption factor ρ. Among these data flows that are suffering from errors, pre-empted resource is offered to rigid data flows first. When all rigid data flows have performed their retransmissions, the pre-empted resource is allocated to elastic data flows in pre-empted state. Stated otherwise, the scheduling scheme is not so based on fairness between all data flows but rather on fairness between data flow within the same service. The algorithms described above allow to provide more bandwidth to the data flows that experience errors by mean of a pre-emption factor. At first sight, the pre-emption factor value depends on a Packet Error Rate and some relative QoS parameters of the applications carried by the data flows. This is studied later below in the case of an audio-video flow that is scheduled together with a TCP flow. Furthermore, the pre-emption factor should be taken into account by the CAC when accepting a new elastic data flow so that potential degradation could be graceful enough.

The next section will describe some results of simulation provided by an implementation of one embodiment of the present invention.

Simulation Set-Up

Figure 3:
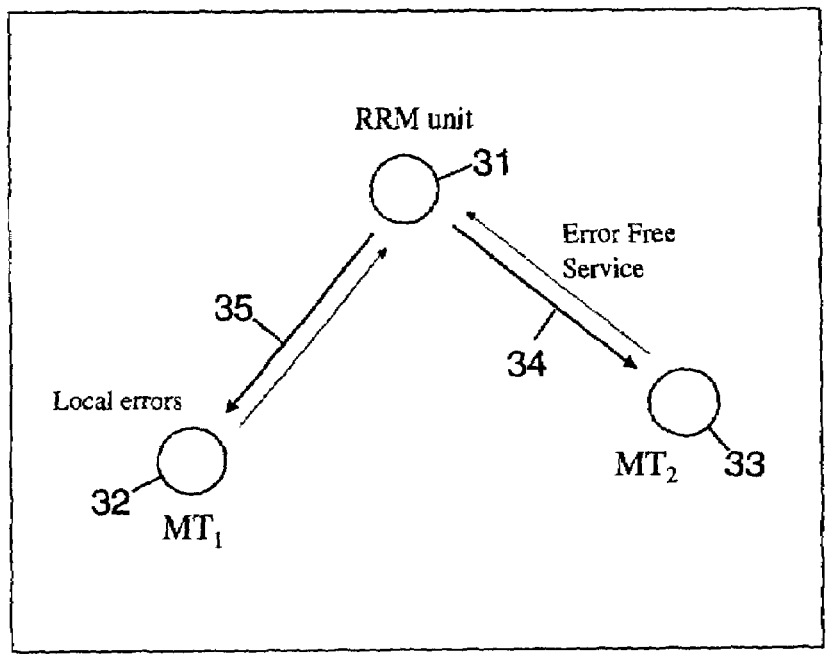
FIG. 3 shows an exemplary network topology used for testing one embodiment of the present invention.

The FIG. 3 illustrates a network topology which is used for the simulation. The network comprises an RRM unit 31, an $MT_1$ 32 and an $MT_2$ 33. A data flow between the RRM unit 31 and the $MT_2$ 33 is referenced 34 and a data flow between the RRM unit 31 and the $MT_1$ 32 is referenced 35. No transmission error is detected on the data flow 34, whereas some transmission errors are detected on reception of the data flow 35 on the $MT_1$ 32 side. The simulator implements a full HLAN/2 DLC layer with an ideal ARQ mechanism so that the whole ARQ window of a receiver of a data flow can be known from the transmitter level at every frame. On top of the DLC layer, a convergence layer performs a function of segmentation and re-assembly and delivers LCH-PDUs carrying user data to the DLC layer. The model cuts the granularity of the PHY layer down to the PDU level. The error model assumes an independent identical distribution of the Bit Error Rate or BER. The Packet Error Rate or PER applied on the LCH-PDUs is then a Bernoulli process derived from the BER and is included in a range compatible with the typical ARQ capabilities, i.e. up to $2.10^{-1}$ as it is described in the document R. Rollet, C. Rosier, H. Bonneville, C. Mangin, "Field trial results at DLC layer of a HLAN/2 prototype," VTC Spring 2003. For each simulation, the average PER over the whole duration of the simulation is given as reference. As opposed to this, it is considered that the signalling messages are always carried without loss. This hypothesis remains realistic since signalling packets are short and can be sent using more robust PHY schemes.

In the case illustrated in FIG. 3, the rigid data flows carry a voice/audio/video data flow simulated using a Constant Bit Rate or CBR source. In this case, the size of the application packet matches the size of the LCH-PDUs. The elastic data flows are fed by a CBR source or carry FTP file transfer depending on the scenario. In the latter, a FTP/TCP/IP stack is integrated at each end point of the elastic data flow. The parameters are summarised in the following table:

TABLE 1

| Simulation parameters | |
|---|---|
| Environment Parameters | |
| Simulation duration | 10 s or 1 s |
| Error model | Bernoulli process applied all along the simulation or during one burst. The target mean PER goes up to 0.2. |
| TCP parameters ~RENO | |
| Max segment size | 1500 bytes (Ethernet) |
| Receive buffer | 8760 bytes |
| Delay ACK mechanism | Segment/clock |
| Maximum ACK Delay | 0.001 s |
| Fast retransmit | Enable |
| Fast Recovery | Enable |
| Window scaling | Disable |
| Selective ACK | Disable |
| Nagle's SWS Avoidance | Disable |
| Karn's algorithm | Enable |
| Retransmission thresholds | Attempts based |
| Initial RTO | 1 s |
| Minimum RTO | 0.5 s |
| Maximum RTO | 64 s |
| RTT gain | ⅛ |
| Deviation gain | ¼ |
| RTT deviation coefficient | 4 s |
| Timer granularity | 0.1 s |
| Persistence time out | 1 s |

The performance parameters under study are transmission delay and effective throughputs. LCH transmission delay is defined as the interval between the time the LCH is added to the DLC input queue by the Segmentation process in the transmitter, and the time the same LCH is successfully received by the receiver. In all simulations, the aggregated DLC throughput dedicated to compensated data flows is equal to 25 LCHs per frame (4.8 Mbit/s). The same DLC throughput is allocated to the pre-empted data flows as a whole. In addition, in order not to address too many interfering mechanisms in the same experiment, effects of signalling (MAC, ARQ, TCP) are ignored.

Effects of Resource Allocation Method on Rigid Data Flows

Figure 4:
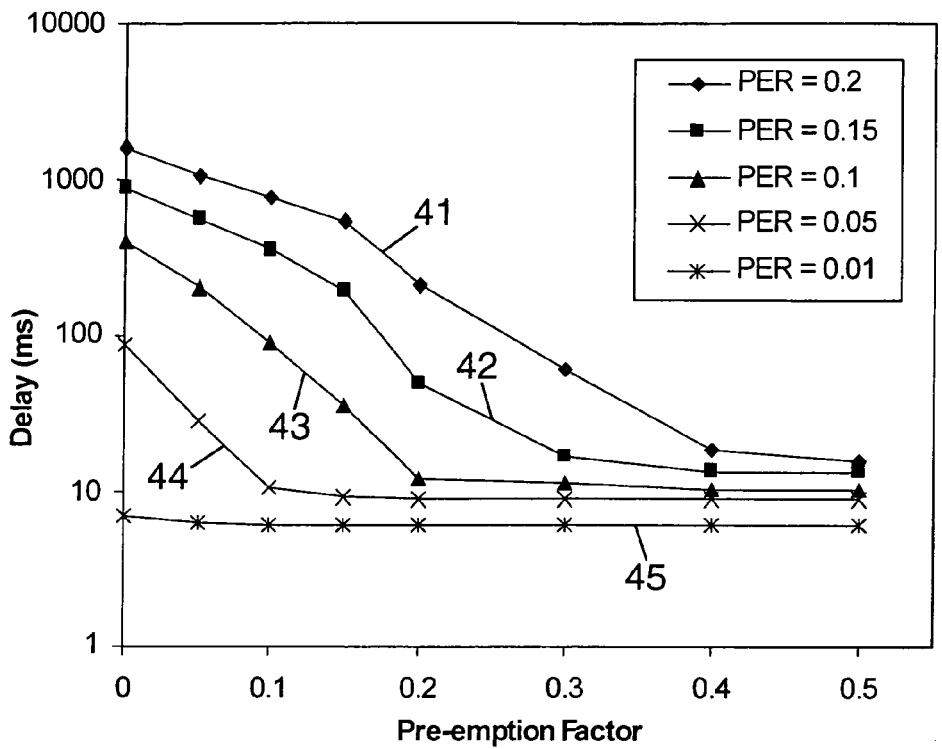
FIG. 4 presents test results about an evolution of the maximum delay experienced by a given type data flow according to one embodiment of the invention.

In the section, a rigid data flow experiencing error is scheduled with an elastic data flow considered as error-free. The latter is pre-empted and resource is redistributed to the rigid data flow since the system is then almost in compensation state. On this basis, several simulations are running with different average PER values over 10 s. FIG. 4 illustrates an evolution of the maximum delay experienced by the rigid data flow according to the pre-emption factor applied to the elastic data flow. More precisely, the curve referenced 41 presents simulation results obtained with a PER value of 0.2, the curve 42 is obtained with a PER value of 0.15, the curve 43 is obtained with a PER value of 0.1, the curve 44 is obtained with a PER value of 0.05 and the curve 45 is obtained with a PER value of 0.001. The factor of pre emption ranges from 0 to 0.5. The maximum transmission delay is the combination of the waiting time in the DLC input queue before first emission and the multiple retransmissions of a single LCH. From these simulations, a minimum pre-emption factor can be determined so that the maximum transmission delay remains compatible with the QoS required by the application transported by the rigid data flows. This minimum threshold is roughly equal to $\overline{per}/(1-\overline{per})$ where $\overline{per}$ is the average PER calculated over the simulation time. This formula conveys the capacity of the system to provide an amount of extra transmission resource at least equal to the number of corrupted packets over the whole duration of the simulation. However, the implemented error model does not provide a uniformly distributed PER. Considering short time interval, the PER can become greater than $\overline{per}$ which implies that the amount of pre-empted resource in one or more consecutive frames is then occasionally insufficient to compensate LCH losses. It results from it that an LCH accumulation occurs in the input DLC queue and consequently that the delay for the subsequent LCHs increases. Next, the rigid data flow catches up its delay when PER becomes lower than $\overline{per}$.

It is important to note here that this behaviour remains identical when the bandwidth is shared between several elastic data flows. In this case, the sum of the weighted pre-emption factors shall be considered instead of the unique pre-emption factor.

Effects of Resource Allocation Method on Elastic Data Flows

Figure 5:
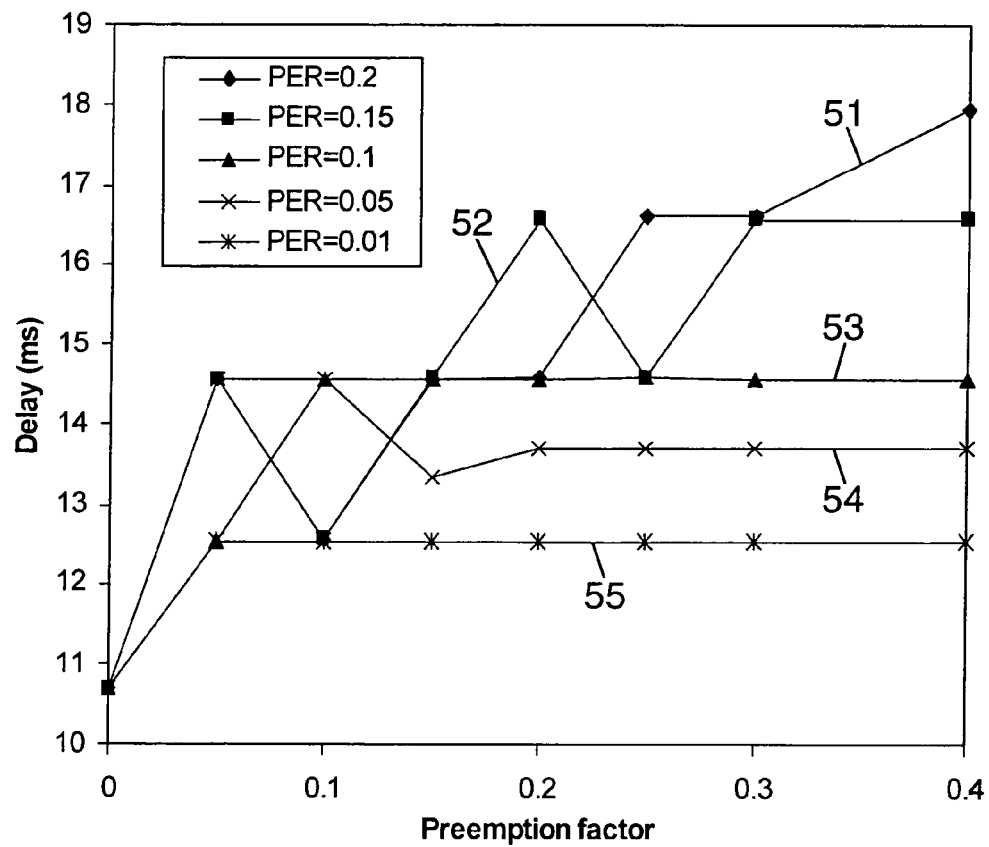
FIG. 5 presents test results about a transmission delay experienced by a given type of data flow according for one embodiment of the invention.

This section highlights the impact at application level of pre-emption scheme over an elastic data flow carrying a TCP data flow according to the pre-emption factor value. The same configuration is used as described above where only the rigid data flow faces error while the elastic one that transports a TCP data flow is pre-empted. FIG. 5 illustrates the delay experienced by the elastic data flow according to the pre-emption factor. The curves referenced 51, 52, 53 and 54 illustrate results respectively obtained with a PER value of 0.2, 0.15, 0.1, 0.05 and 0.01.

Figure 6:
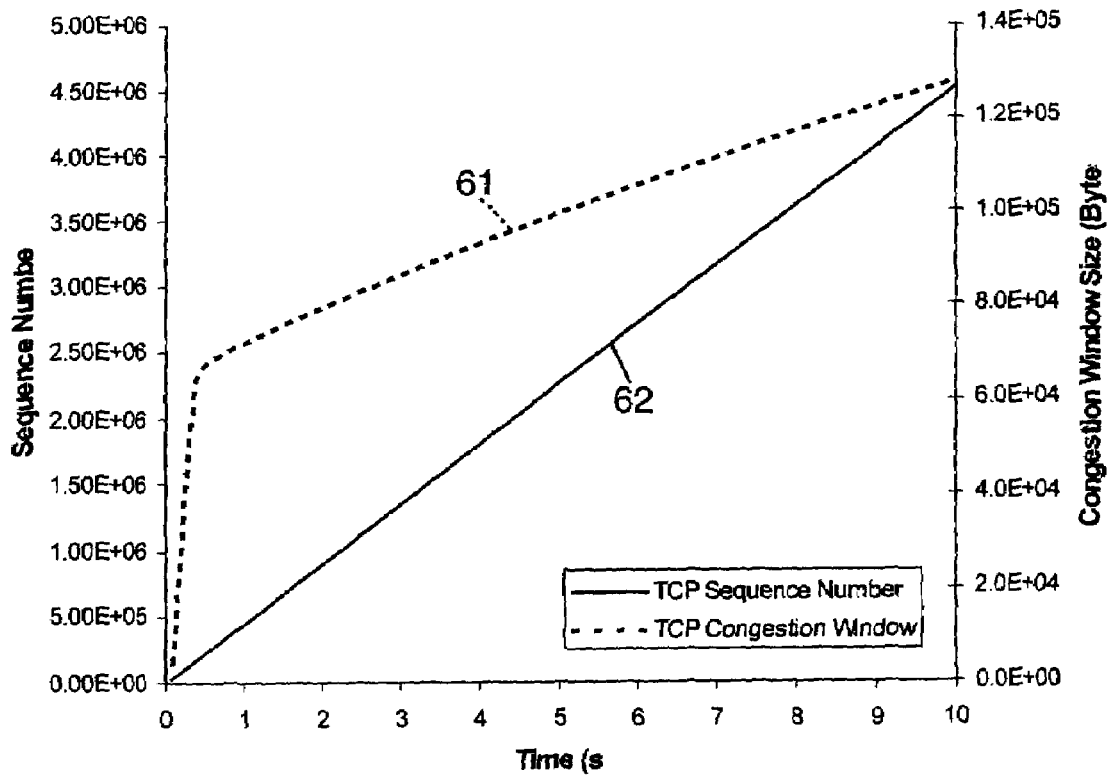
FIG. 6 illustrates test results about an evolution of TCP segment sequence numbers and a congestion window along time according to one embodiment of the invention.

FIG. 6 shows the evolution of the TCP segment sequence numbers and the congestion window along time with a typical RTT of 10 ms. From the curves referenced 61 and 62, it can be deduced that the TCP transmitter never detects any congestion despite the throughput reduction induced by the pre-emption scheme. Consequently, the TCP transmitter does not experience full segment retransmission which would induce bandwidth loss.

The same simulations have been performed with two elastic data flows among which one experiences errors. Both data flows have the same weight. While the pre-emption factor is sufficiently high, the compensation mechanism introduced for the elastic data flows limits the transmission delay of the compensated data flow and can guarantee a good operation of TCP.

Comparison of Rigid and Elastic Data Flows Behaviours in Different Error Conditions In this section, some simulations are conducted to highlight the impact of a burst of errors on the throughput experienced by applications in different configurations. The figures presented in this section show the evolution of the number of packets that are successfully transferred along time for the different data flows involved in each simulation. This parameter directly reflects the application throughput the network is able to transport over each DLC data flow.

Whatever the type of data flows, a CBR data flow is applied to every opened data flows. For rigid data flow, the application bit rate is equal to the nominal DLC throughput. For elastic data flows, the application bit rate is set so that the system is sufficiently loaded. All simulations have been performed over 1 second and a period of error with a PER equal to $2.10^{-1}$ is inserted between t=0.25 s and t=0.75 s for a subset of data flows listed in the following sub-section. Outside this erroneous period, the channel is clear. The pre-emption factors applied to elastic data flows are set so that rigid data flows can be sufficiently compensated in order to keep their maximum delay transmission lower than their upper age bound $A_{Max,i}$.

Figure 7:
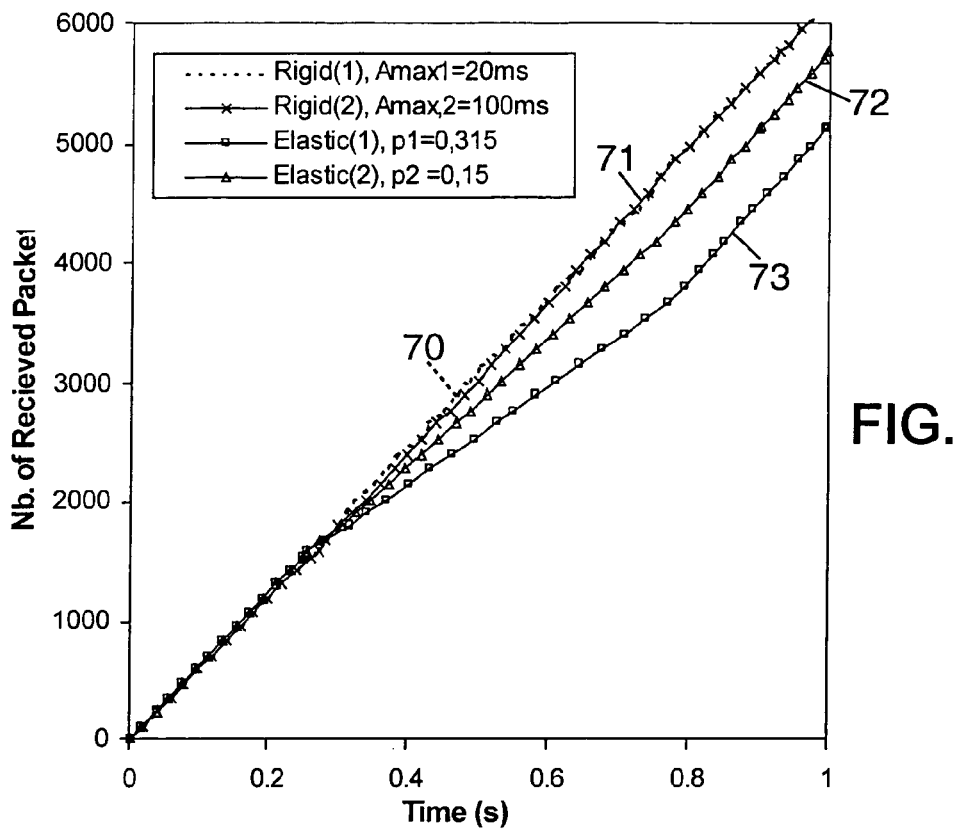
FIG. 7 presents test results about an evolution along time of a data volume that is successfully transferred for each data flow according to on embodiment of the invention.

Benefit of Compensation on Error-Prone Rigid Data Flows and Impact on Error-Free Elastic Data Flows In this simulation, two rigid data flows with a different upper age bound $A_{Max,i}$ and two elastic data flows with different pre-emption factor are set-up. Only rigid data flows face errors whereas some resource is pre-empted from elastic data flows. The weights of rigid and elastic data flows are identical. The curves referenced 70, 71, 72 and 73 in FIG. 7 represent the evolution along time of the data volume that is successfully transferred for each data flow. The curves 70 and 71 represent testing results relative to rigid data flows, whereas the curves 72 and 73 illustrate testing results relative to elastic data flows.

Figure 8:
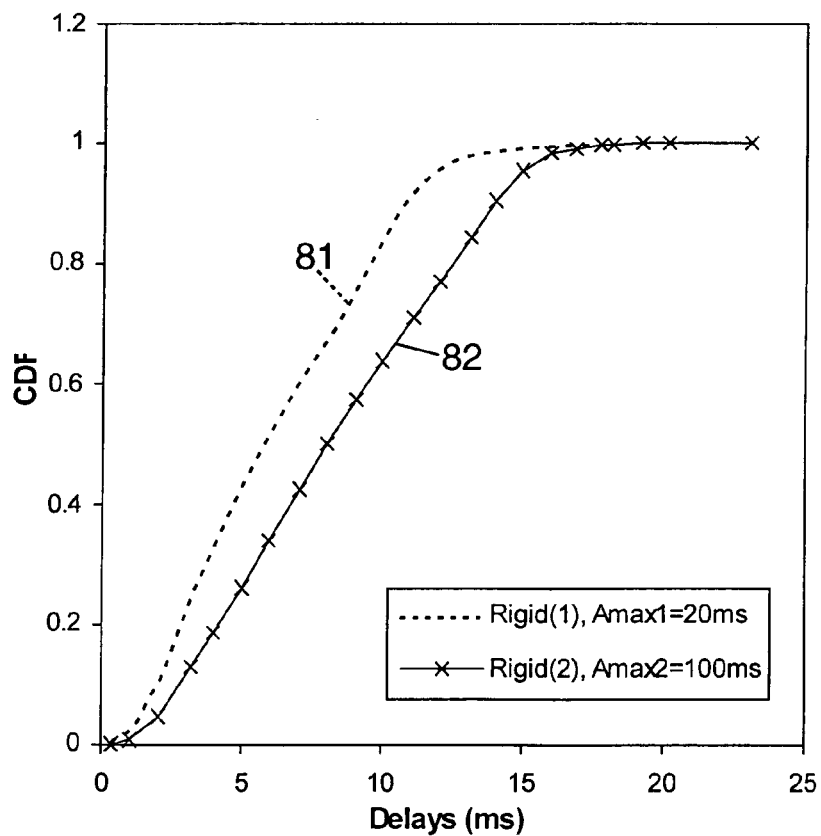
FIG. 8 illustrates test results about a cumulative distribution of transmission delay for rigid data flows according to one embodiment of the invention.

When rigid data flows do not face errors, all data flows are scheduled identically. When errors occur, the system enters compensation state. Consequently; both elastic data flows are pre-empted and the slope of the associated curves becomes lower than the ones of rigid data flows. When the pre-empted resource is temporary deficient to compensate packet losses, the rigid data flow with the more stringent QoS parameter, i.e. the lower $A_{Max,i}$, is favoured when redistributing pre-empted resource. This behaviour allows to guarantee shorter transmission delay for this data flow as shown by the Cumulative Distribution Function (CDF) of delay transmission presented in FIG. 8. In particular, the maximum delay is kept lower than the chosen $A_{Max,i}$. Once the pre-empted resource becomes sufficient due to PER reduction, rigid data flows catch up the delay and use all the available pre-empted resource to perform retransmission.

Concerning elastic data flows, the slope of their curves 72 and 73 is inversely proportional to the pre-emption factor during the compensation state. Slope variation during this period can be explained by the instant PER variation in each frame. During some time intervals, rigid data flows do not require the maximum amount of pre-empted resource because packet losses are attenuated.

Benefit of Compensation on Error-Prone Elastic Data Flows

Figure 9:
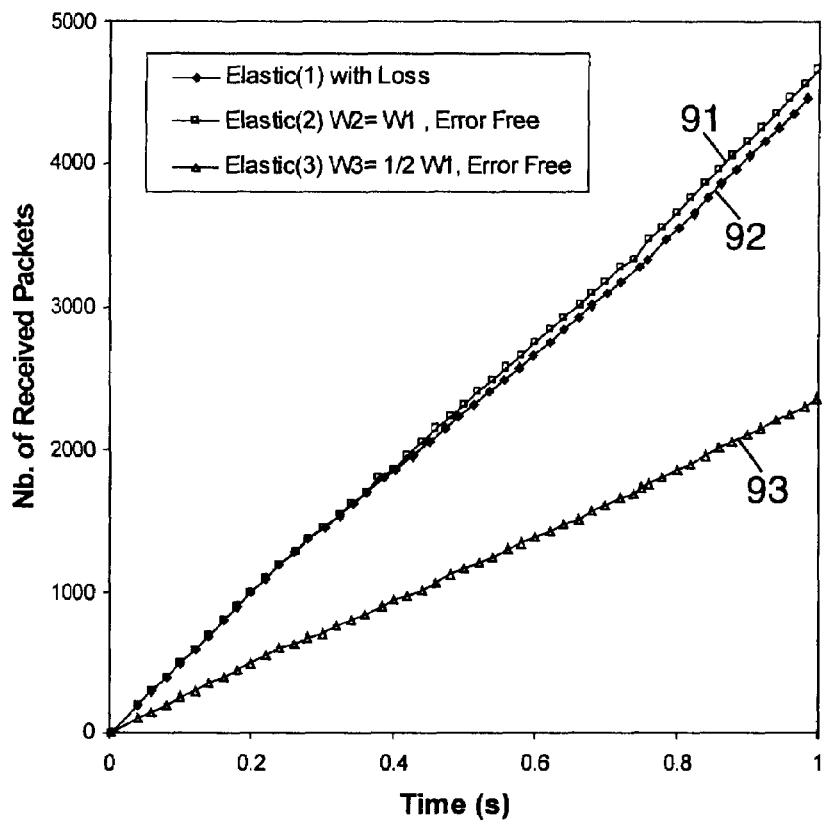
FIG. 9 represents test results about an evolution of a data volume that is successfully transferred for each data flow along a simulation according to one embodiment of the invention.

In this simulation, three elastic data flows are set-up to show the operation of the compensation mechanism introduced for the elastic data flows experiencing errors. FIG. 9 represents the evolution of the data volume that is successfully transferred for each data flow along the simulation. Data flows referenced 91 and 92 have different weights ($W_1<W_2$) and face errors. Data flow referenced 93 does not suffer from any loss and has a weight equal to data flow 2 ($W_3=W_2$).

Outside the error period, the bandwidth (25 PDUs/frame) is shared between elastic data flows by respecting the weights. Consequently, data flows 91 and 93 get the same amount of resource. In compensation state, some resource is pre-empted over the three data flows and is redistributed to data 91 and 92 that experience error. The curve slope of each data flow decreases, which means that all data flows are impacted by packet losses. Although data flow 93 does not experience error, the resulting throughput available for the transported application is identical to data flow 91. Indeed, the compensation mechanism for elastic data flow spreads the impact of error over all elastic data flows, which reduces the throughput loss on each of them and limits the effect at application level as seen before. However, this mechanism is limited by the pre-emption factor which prevents one data flow from starving the others.

Compensation Comparison Between Rigid and Elastic Data Flows

Figure 10:
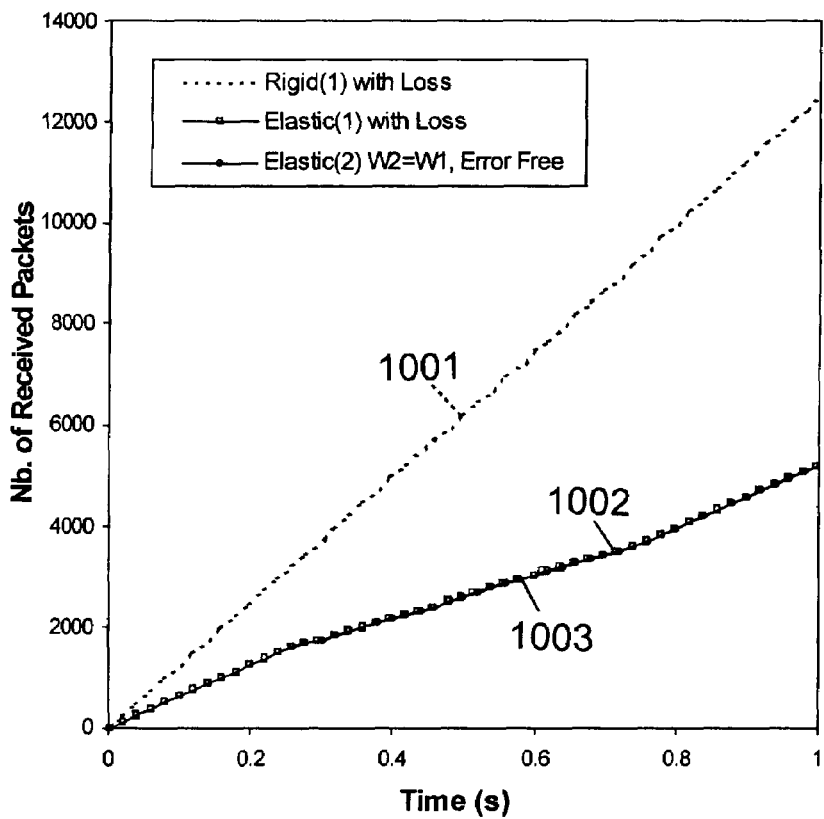
FIG. 10 represents test results about an evolution of the data volume that is successfully transferred for each data flow along a simulation according to one embodiment of the invention.

In this simulation, one rigid and two elastic data flows are set-up to demonstrate the difference of compensation between rigid and elastic data flows. The rigid as well as one elastic data flows experience errors during the period specified above while the second elastic data flow relies on a clear channel. All elastic data flows have an identical weight and the same pre-emption factor. FIG. 10 represents the evolution of the data volume that is successfully transferred for each data flow along the simulation. The curves referenced 1001, 1002. and 1003 illustrate corresponding testing results. The curve 101 illustrates a rigid data flow, whereas the curves 1002 and 1003 illustrate elastic data flows.

When errors occur on the rigid and the elastic data flows, some resource is pre-empted from both elastic data flows 1002 and 1003 and is redistributed with priority to the rigid data flow 1001. As long as the pre-emption factor is sufficiently high so that the error is compensated, no effect is noticed on the throughput of the rigid data flow 1001. In the same time, both elastic data flows 1002 and 1003 have the slope of their curves reduced in the same way even if one of the data flows does not experience error. Indeed, as explained in the previous simulation results, the compensation mechanism for elastic data flows 102 and 103 results in evening the throughput available for the applications transported over elastic data flows in the proportion of their respective weight.

In conclusion, the scheduling algorithms proposed herein can enforce the quality of service requirements of the applications that are carried over a wireless link even in the occurrence of errors. They exploit at best the difference of the application requirements transported over the network so that applications with strong QoS constraints can be favoured against applications that are more tolerant. This scheme is preferably applied at two stages. First, two classes of application data flows are distinguished: CBR data flows transported over rigid DLC data flows and best effort data flows transported over elastic DLC data flows. This distinction allows to pre-empt some resource from the elastic data flows as soon as one of the rigid data flow experiences errors. The application throughput and delay are guaranteed for the rigid data flows whereas the impact on the elastic data flows remains tolerable for the transported application. At a second stage, in the redistribution process, rigid data flows with the most stringent QoS parameters are favoured among the rigid data flows. Concerning elastic data flows, the throughput provided to the application depends on the attributed weight only and is independent from the errors experienced by the data flows that transport the application data flows. However, this feature of the algorithm is limited by the definition of a pre-emption factor attributed to each elastic data flow so that a rigid or elastic data flow facing too many errors cannot starve the others.

As it has already been described herein above, the parameters used by the scheduling mechanism depends on the application requirements. For application generating CBR data flows, the peak bit rate and maximum transfer delay can be used to set up the corresponding DLC data flow. The choice of the pre-emption factor parameter results from a compromise between the maximum level of errors that can be supported by a rigid data flow and the pre-emption impact on the elastic data flows. Consequently, the protocol transported over elastic data flows shall also be considered. In this description, TCP is used as a reference to prove the validity of the proposed mechanism and the error pre-emption compromise it is able to provide. In a comprehensive system, this compromise also depends on the performance of the implemented ARQ mechanism and on the available adaptive transmission mechanism provided by the PHY layer.

To sum up, one embodiment of the present invention can be advantageously applied to an existing wireless DLC protocol such as HLAN/2 that is taking benefits from its centralised allocation and error control based on a selective repeat ARQ. Furthermore, it is important to note that it can be easily configured using a small set of parameters and that it is well adapted to future WLAN or Power Line systems through its ability to manage application data flows with a large diversity of QoS requirements.

The invention claimed is:

1. A method of dynamic transmission resource allocation in a wireless network, that includes a plurality of Mobile Terminals (MTs) each configured to manage a number of different data flows of Protocol Data Units (PDUs) that are classified according to a set of predetermined flow types, a Radio Resource Management unit (RRM) configured to allocate transmission resources on a per PDU basis, a plurality of schedulers each associated with a respective flow type and each configured to carry out a respective scheduling scheme according to a corresponding set of rules, each flow type being assigned a corresponding priority from a set of predetermined priorities, and a selector configured to share the transmission resource among the MTs, the method comprising:

sending Request Resource (RR) messages from the MTs to the RRM to request the transmission resource for transmission of pending PDUs, each RR message including a corresponding flow type information;

dispatching, by the RRM, each RR message in the RR messages to a scheduler associated with the corresponding flow type information;

electing, independently at each of the plurality of schedulers, one of the dispatched PDUs as a candidate for a next transmission resource allocation based on the corresponding set of rules to elect a plurality of candidates; and allocating, by the selector, the transmission resource to a selected candidate among the plurality of candidates based on a predetermined priority rule based on the priority of the flow type of the selected candidate, wherein the set of predetermined flow types includes a first set of flow types and a second set of flow types, and flow types in the first set of flow types have assigned priorities that are higher than flow types in the second set of flow types, the corresponding set of rules of each scheduler associated to a flow type in the second set of flow types includes a first subset of rules applied in case of error free transmission, and a second subset of rules different from the first subset of rules and applied in case of transmission errors, and the second subset of rules includes a bandwidth allocation rule that allocates less bandwidth to data flows belonging to the second set of flow types than to data flows belonging to the first set of flow types.

2. The method of claim 1, wherein the first set of flow types comprises real time data flows and the second set of flow types comprises non real time data flows.

3. The method of claim 1, wherein the corresponding set of rules applied by each scheduler comprises a rule which provides that the transmission resource is allocated in a hierarchical manner as a function of the respective flow type priorities, an available transmission resource being granted first to the candidate of the flow type of the first set of flow types which exhibits the highest priority.

4. The method of claim 1, wherein the corresponding set of rules applied by each scheduler comprises a rule which provides that the transmission resource is allocated to a flow type which is comparatively less tolerant to a transmission delay before the transmission resource is allocated to a flow type that is comparatively more tolerant to the transmission delay.

5. The method of claim 1, wherein the bandwidth allocation rule allocates bandwidth based on a pre-emption factor $\rho$ which is predetermined for each data flow belonging to the second set of flow types.

6. The method of claim 1, wherein the corresponding set of rules of each scheduler associated to a flow type of the second set of flow types comprises a rule based on a Self Clocked Fair Queuing (SCFQ) algorithm, and wherein the transmission resource allocation is based on a weight associated to each data flow in order to perform the election of the candidate in a given proportion of a predetermined share of bandwidth.

7. The method of claim 6, wherein the second subset of rules further comprises a rule applied when transmission errors are detected on at least one data flow, according to which the election of the candidate for the next transmission resource allocation is performed in priority among a set of data flows experiencing transmission errors in proportion to the weight associated to each data flow.

8. The method of claim 1, wherein the corresponding set of rules of each scheduler associated to a flow type in the first set of flow types comprises a rule based on a Virtual Scheduling Algorithm (VSA) algorithm where the transmission resource allocation is based on a Theoretical Transmission Time (TTT) between emission of two consecutive packets in a data flow of said flow type so as to provide a guaranteed delay and a guaranteed bandwidth.

9. The method of claim 8, wherein the corresponding set of rules of each scheduler associated to a flow type in the first set of flow types further comprises a rule applied when transmission errors are detected on a data flow, said rule electing a candidate for the next transmission resource allocation by
defining a PDU age for each PDU to be retransmitted,
defining a maximum age for each data flow,
allocating the transmission resource to the data flow having a greatest value of the PDU age divided by the maximum age, and
discarding PDUs to be retransmitted having a corresponding age greater than the maximum age.

10. The method of claim 1, wherein the first set of flow types includes only one flow type and the second set of flow types includes only one flow type.

11. The method of claim 1, wherein each RR message includes an information as to an amount of a requested transmission resource and the electing by each scheduler and the allocating by the selector are based on said information as to an amount of a requested transmission resource.

12. The method of claim 1, further comprising detecting transmission errors based on an ARQ scheme using feedback messages.

13. A device for allocating, on a PDU basis, a transmission resource in a wireless network that includes a plurality of Mobile Terminals (MTs) each configured to manage a number of different data flows of Protocol Data Units (PDUs) that are classified according to a set of predetermined flow types the device comprising:

a plurality of schedulers each associated with a respective flow type and each configured to carry out a respective scheduling scheme according to a corresponding set of rules, each flow type being assigned a corresponding priority from a set of predetermined priorities;
a selector configured to share the transmission resource among the MTs;
a receiving unit configured to receive Request Resource (RR) messages from the MTs requesting the transmission resource for transmission of pending PDUs, each RR message including a corresponding flow type information;
a dispatching unit configured to dispatch each RR message in the RR messages to a scheduler associated with the corresponding flow type information;
an electing unit in each of the plurality of schedulers configured to elect, independent of electing units in the other schedulers, one of the dispatched PDUs as a candidate for a next transmission resource allocation based on the corresponding set of rules to elect a plurality of candidates; and
the selector configured to allocate the transmission resource to a selected candidate among the plurality of candidates based on a predetermined priority rule based on the priority of the flow type of the selected candidate, wherein
the set of predetermined flow types includes a first set of flow types and a second set of flow types, and flow types in the first set of flow types have assigned priorities that are higher than flow types in the second set of flow types,
the corresponding set of rules of each scheduler associated to a flow type in the second set of flow types includes a first subset of rules applied in case of error free transmission, and a second subset of rules different from the first subset of rules and applied in case of transmission errors, and
the second subset of rules includes a bandwidth allocation rule that allocates less bandwidth to data flows belonging to the second set of flow types than to data flows belonging to the first set of flow types.

14. The device of claim 13, wherein the first set of flow types comprises real time data flows and the second set of flow types comprises non real time data flows.

15. The device of claim 13, wherein each scheduler is configured to apply the corresponding set of rules that comprises a rule which provides that the transmission resource is allocated in a hierarchical manner as a function of the respective flow type priorities, an available transmission resource being granted first to the candidate of the flow type of the first set of flow types which exhibits the highest priority.

16. The device of claim 13, wherein each scheduler is configured to apply the corresponding set of rules that comprises a rule which provides that the transmission resource is allocated to a flow type which is comparatively less tolerant to a transmission delay before the transmission resource is allocated to a flow type that is comparatively more tolerant to the transmission delay.

17. The device of claim 13, wherein the bandwidth allocation rule allocates bandwidth based on a pre-emption factor $\rho$, which is predetermined for each data flow belonging to the second set of flow types.

18. The device of claim 13, wherein each selector is configured to apply the corresponding set of rules associated to a flow type of the second set of flow types that comprises a rule based on a Self Clocked Fair Queuing (SCFQ) algorithm, and the selector is further configured to allocate the transmission resource based on a weight associated to each data flow in order for the electing unit to perform the election of the candidate in a given proportion of a predetermined share of bandwidth.

19. The device of claim 18, wherein the second subset of rules further comprises a rule applied when transmission errors are detected on at least one data flow, according to which the election of the candidate for the next transmission resource allocation is performed in priority among a set of data flows experiencing transmission errors in proportion to the weight associated to each data flow.

20. The device of claim 13, wherein the corresponding set of rules of each scheduler associated to a flow type in the first set of flow types comprises a rule based on a Virtual Scheduling Algorithm (VSA) algorithm where the transmission resource allocation is based on a Theoretical Transmission Time (TTT) between emission of two consecutive packets in a data flow of said flow type so as to provide a guaranteed delay and a guaranteed bandwidth.

21. The device of claim 20, wherein the corresponding set of rules of each scheduler associated to a flow type in the first set of flow types further comprises a rule applied when transmission errors are detected on a data flow, said scheduler further configured to define a PDU age for each PDU to be retransmitted, define a maximum age for each data flow, allocate the transmission resource to the data flow having a greatest value of the PDU age divided by the maximum age, and discard PDUs to be retransmitted having a corresponding age greater than the maximum age.

22. The device of claim 13, wherein the first set of flow types includes only one flow type and the second set of flow types includes only one flow type.

23. The device of claim 13, wherein each RR message includes an information as to an amount of a requested transmission resource and the scheduler is further configured to elect based on the information and the selector is further configured to allocate based on said information as to an amount of a requested transmission resource.

24. The device of claim 13, wherein the receiving unit is further configured to detect transmission errors based on an ARQ scheme using feedback messages.

* * * * *